United States Patent
Sun et al.

(10) Patent No.: US 11,200,266 B2
(45) Date of Patent: Dec. 14, 2021

(54) IDENTIFYING NAMED ENTITIES IN QUESTIONS RELATED TO STRUCTURED DATA

(71) Applicant: International Business Machines Corporation, Armonk, NY (US)

(72) Inventors: Changying Sun, Ottawa (CA); Lin Luo, Carp (CA)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/435,740

(22) Filed: Jun. 10, 2019

(65) Prior Publication Data
US 2020/0387530 A1    Dec. 10, 2020

(51) Int. Cl.
*G06F 16/33*     (2019.01)
*G06F 16/332*    (2019.01)

(52) U.S. Cl.
CPC ...... *G06F 16/3344* (2019.01); *G06F 16/3329* (2019.01)

(58) Field of Classification Search
CPC .................................................. G06F 16/3344
See application file for complete search history.

(56) References Cited

U.S. PATENT DOCUMENTS

| | | |
|---|---|---|
| 9,292,797 B2 | 3/2016 | He et al. |
| 2003/0069880 A1* | 4/2003 | Harrison ............. G06F 16/3334 |
| 2011/0225155 A1* | 9/2011 | Roulland .............. G06F 16/285 |
| | | 707/737 |
| 2013/0262501 A1 | 10/2013 | Kuchmann-Beauger et al. |
| 2014/0006012 A1* | 1/2014 | Zhou .................... G06F 16/3344 |
| | | 704/9 |
| 2014/0114942 A1* | 4/2014 | Belakovskiy ......... G06F 16/328 |
| | | 707/706 |

(Continued)

OTHER PUBLICATIONS

"Stanford Named Entity Recognizer", The Stanford Natural Language Processing Group, https://nlp.stanford.edu/software/CRF-NER.shtml, Sep. 18, 2006, 5 pages.

(Continued)

*Primary Examiner* — Van H Oberly
(74) *Attorney, Agent, or Firm* — William H. Hartwell

(57) ABSTRACT

Some embodiments include a method for identifying named entities in a question received in a question and answer system. The method can include receiving the question and constructing, via a named entity controller, a search query using all words in the question. The method can also include searching a named entity index for records that include named entity fields associated with certain of the words in the question. The method can also include determining a search score for each of the records based, at least in part, on how closely words in the question match a field of the record. The method can also include determining a weighted score for each of the records based on where the words in the question are positioned in the question. The method can also include creating a list of records including one or more of the records whose weighted score is above a threshold score. The method can also include providing the list of records for use in answering questions in the question and answer system.

20 Claims, 8 Drawing Sheets

(56) References Cited

U.S. PATENT DOCUMENTS

2014/0229481 A1* 8/2014 Qureshi .................. G06F 16/24
 707/736
2016/0092448 A1 3/2016 Byron et al.
2016/0171507 A1 6/2016 Fanous et al.
2016/0275152 A1 9/2016 Gunjan

OTHER PUBLICATIONS

Al-Rfou, "Named Entity Extraction", http://polyglot.readthedocs.io/en/latest/NamedEntityRecognition.html, 2014, 3 pages.
Ashaolu, "Query Understanding Applying Machine Learning Algorithms for Named Entity Recognition", IT4BI MSC Thesis, Master in Information Technologies for Business Intelligence, Universitat Politecnica de Catalunya, Jul. 2014, 81 pages.
Benton, et al., "Faster (and Better) Entity Linking With Cascades", Human Language Technology Center of Excellence, 2014, 6 pages.
Cowan, et al., "Named Entity Recognition in Travel-Related Search Queries", Proceedings of the Twenty-Seventh Conference on Innovative Application of Artificial Intelligence, 2015, pp. 3935-3941.
Rud, et al., "Piggyback: Using Search Engines for Robust Cross-Domain Named Entity Recognition", Proceedings of the 49th Annual Meeting of the Association for Computational Linguistics, Jun. 19-24, 2011, pp. 965-975.
Waltinger, "Market Intelligence: Linked Data-Driven Entity Resolution for Customer and Competitor Analysis", Web Engineering Lecture Notes in Computer Science, vol. 7977, Jul. 7, 2013, 4 pages.

* cited by examiner

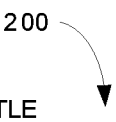

| TITLE | YEAR | RELEASE DAY | SEASON | BOX OFFICE | BUDGET |
|---|---|---|---|---|---|
| the hills have eyes 2 | 2007 | FRIDAY | WINTER | 3958 | 15 |
| what happens in vegas | 2008 | FRIDAY | WINTER | 14264 | 100 |
| love happens | 2009 | FRIDAY | WINTER | 5362 | 20 |

RECORD 1

| INSTANCE | THE HILLS HAVE EYES 2 |
|---|---|
| INSTANCE CLUE | the hill have eye 2 |
| ENTITY | TITLE |
| DOMAIN | MOVIE |
| DATA SET ID | 9BB4FE76 |

RECORD 2

| INSTANCE | WHAT HAPPENS IN VEGAS |
|---|---|
| INSTANCE CLUE | what happen in vegas |
| ENTITY | TITLE |
| DOMAIN | MOVIE |
| DATA SET ID | 9BB4FE77 |

RECORD 3

| INSTANCE | LOVE HAPPENS |
|---|---|
| INSTANCE CLUE | love happen |
| ENTITY | TITLE |
| DOMAIN | MOVIE |
| DATA SET ID | 9BB4FE78 |

FIG. 2

```
Hits:[
    {
        "_score": 0.52899104,                                    402
        "_source": {
            "instance": "What Happens in Vegas",
            "instance clue": "what happens in vegas",
            "entity": "Title",
            "domain": "movie",
            "datasetID" : 9bbf4e76
        }
    }
    {
        "_score": 0.52821475,                                    404
        "_source": {
            "instance": "Love Happens",
            "instance clue": "love happens",
            "entity": "Title",
            "domain": "movie",
            "datasetID" : 9bbf4e77
        }
    }
    {
        "_score": 0.49435568,                                    406
        "_source": {
            "instance": "The X-Files: I Want to Believe",
            "instance clue": "the x-file i want to believe",
            "entity": "Title",
            "domain": "movie",
            "datasetID" : 91bbf4e78
        }
    }
    {
        "_score": 0.31258178,                                    408
        "_source": {
            "instance": "The Box",
            "instance clue": "the box",
            "entity": "Title",
            "domain": "movie",
            "datasetID" : 91bbf4e79
        }
    }
]
```

FIG. 4

```
{
    "weightedScore" : 0.18892537
    "_score": 0.52899104
    "_source": {
        "instance": "What Happens in Vegas",
        "instance clue": "what happens in vegas",
        "entity": "Title",
        "domain": "movie",
        "datasetID" : 9bbf4e76
    }
}
```
502

```
{
    "weightedScore" : 0.52821475
    "_score": 0.52821475
    "_source": {
        "instance": "Love Happens",
        "instance clue": "love happens",
        "entity": "Title",
        "domain": "movie",
        "datasetID" : 9bbf4e77
    }
}
```
504

```
{
    "weightedScore" : 0.49435568
    "_score": 0.49435568
    "_source": {
        "instance": "The X-Files: I Want to Believe",
        "instance clue": "the x-file i want to believe",
        "entity": "Title",
        "domain": "movie",
        "datasetID" : 91bbf4e78
    }
}
```
506

```
{
    "weightedScore" :0.31258178
    "_score": 0.49435568
    "_source": {
        "instance": "The Box",
        "instance clue": "the box",
        "entity": "Title",
        "domain": "movie",
        "datasetID" : 91bbf4e79
    }
}
```
508

FIG. 5

```
{       "matched-phrase" : "love happens"
        "weightedScore" : 0.52821475
        "_score": 0.52821475
        "_source": {
                "instance": "Love Happens",
                "instance clue": "love happens",
                "entity": "Title",
                "domain": "movie",
                "datasetID" : 9bbf4e77
        }
}
```
604

```
{
        "matched-phrase" : "the x files"
        "weightedScore" : 0.49435568
        "_score": 0.49435568
        "_source": {
                "instance": "The X-Files: I Want to Believe",
                "instance clue": "the x-file i want to believe",
                "entity": "Title",
                "domain": "movie",
                "datasetID" : 91bbf4e78
        }
}
```
606

FIG. 6

```
{
    "result": [{
        "matched-phrase" : "love happens",
        "confidence": 1.0,
        "named-entities": [{
                "entity": "Title",
                "score" : 0.52821475,
                "instanceHit" : [{
                        "instance": "Love Happens",
                        "score" : 0.52821475,
                        "hitType": "FULL"
                        }]
                }]
        },                                              ~ 704
        {
        "matched-phrase" : "the x files",
        "confidence": 1.0,
        "named-entities":[{
                "entity": "Title",
                "score": 0.49435568,
                "instanceHit": [{
                        "instance": "The X-Files: I Want to Believe",
                        "score": 0.49435568,
                        "hitType": "PARTIAL_NAME"
                        }]
                }]
        }]                                              ~ 706
}
```

FIG. 7

IDENTIFYING NAMED ENTITIES IN QUESTIONS RELATED TO STRUCTURED DATA

BACKGROUND

Embodiments of the inventive subject matter generally relate to the field of automated question answering systems, and more particularly to identifying named entities in questions about structured data in question answering systems.

Cognitive analytics systems (a.k.a. cognitive business analytics systems) typically enable users to import structured data and ask natural language questions about the imported structured data. These systems should be able to correctly understand questions and find answers to the questions in the structured data. Some cognitive business analytics systems utilize natural language processing (NLP) tools that linguistically analyze questions and inter alia identify named entities within the questions. Although many NLP tools can linguistically analyze questions, they may not be able to identify certain named entities for private data sets. NLP tools may also have trouble classifying named entities into relevant domain-specific concepts, such as when natural language questions include multiple named entities connected by conjunctions.

NPL tools may utilize named entity recognition (NER) techniques. Some NER techniques use public data and statistical models to identify named entities. Such NER techniques cannot identify named-entities that only exist in private data because they are unaware of such private entity types. Some NER techniques may be specifically trained for a certain domain, but research indicates NER techniques developed for one domain do not typically perform well on other domains. Also, some NER techniques may classify text into different categories or concepts when the datasets are from different domains. As a result, many NER techniques do not perform well in a cognitive business analytics systems. Furthermore, entity types in a BA system are constantly changing. As users frequently bring in new datasets to the system, they may need to remove obsolete data sets. NER systems operating in interactive business analytics products should be capable of adapting to user data to automatically recognize new entity types and avoid classifying obsolete entity types without delay.

SUMMARY

Some embodiments include a method for identifying named entities in a question received in a question and answer system. The method can include receiving the question by the question and answer system and constructing, via a named entity controller, a search query using all words in the question. The method can also include searching, via the named entity controller, a named entity index for records that include named entity fields associated with certain of the words in the question. The method can also include determining, via the named entity controller, a search score for each of the records based, at least in part, on how closely words in the question match a field of the record. The method can also include determining, via the named entity controller, a weighted score for each of the records based on where the words in the question are positioned in the question. The method can also include creating, via the named entity controller, a list of records including one or more of the records whose weighted score is above a threshold score. The method can also include providing, via the named entity controller, the list of records for use in answering questions in the question and answer system.

BRIEF DESCRIPTION OF THE DRAWINGS

The present embodiments may be better understood, and numerous objects, features, and advantages made apparent to those skilled in the art by referencing the accompanying drawings.

FIG. 2 shows an example input data set in tabular format according to some embodiments.

FIG. 4 illustrates a listing of example matching records from an input data set, according to some embodiments.

FIG. 5 illustrates a listing of matching records for which weighted search scores have been determined, according to some embodiments.

FIG. 6 illustrates a listing of matching records that have been preserved, according to some embodiments.

FIG. 7 illustrates records from the search data that match named entities in the question, according to embodiments.

DESCRIPTION OF EMBODIMENT(S)

Figure 1:
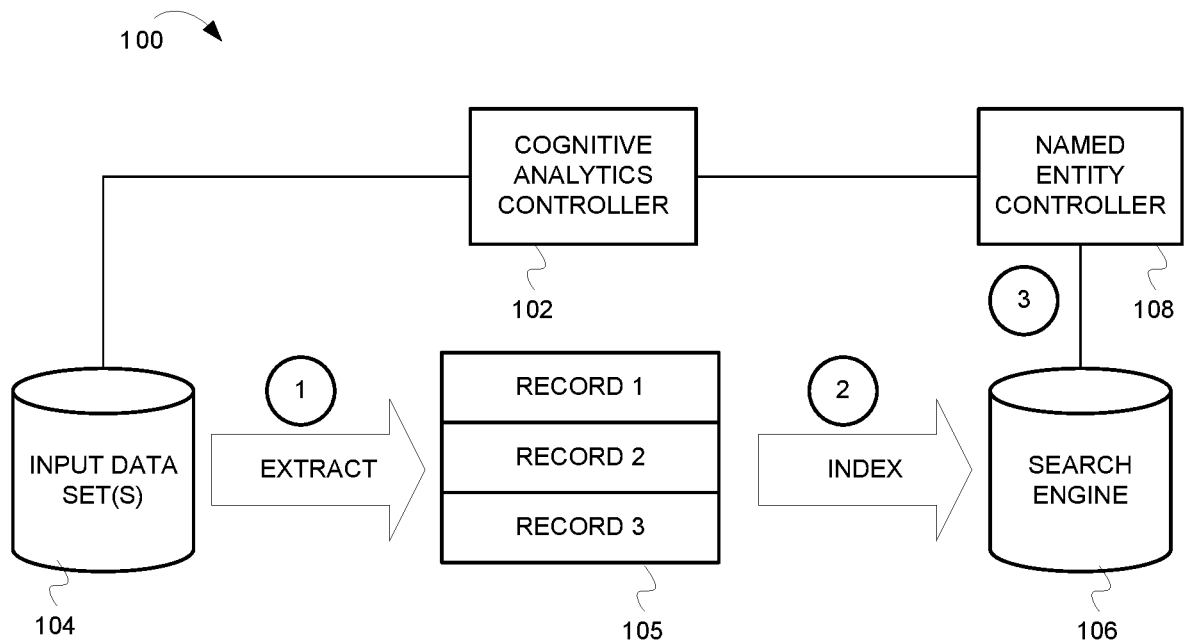
FIG. 1 is a data flow diagram illustrating components, operations, and data flow of some embodiments of the inventive subject matter.

Cognitive analytics systems are computer systems that can answer users' questions based on one or more data sets. With a cognitive analytics system, a user inputs a question in natural language form. The cognitive analytics system processes the natural language question, determines an answer to the question, and presents an answer to the user. For example, a medical-related cognitive analytics system may answer doctors' questions based a collection of medical journal articles. As part of the natural language processing, cognitive analytics systems may perform named entity recognition to better understand questions and to find a correct answers in data sets. Named entities are objects (e.g., persons, locations, organizations, products, etc.) that can be denoted with proper names. Named entities may be abstract or have a physical existence. Examples of named entities include Cristiano Ronaldo, New York City, Volkswagen Golf, or anything else that can be named. Named entities can simply be viewed as entity instances (e.g., New York City is an instance of a city). Some embodiments of the inventive subject matter are effective at identifying named entities in private data sets, where the named entities are not publicly known and where publicly available data may not be helpful in identifying the named entities.

Some embodiments of the inventive subject matter identify named entities in user questions that have been input into a cognitive analytics system. The named entity identification may be part of a greater process of answering the user questions input into the cognitive analytics system. Before processing questions, embodiments of the inventive subject matter configure a named entity index by creating data records for named entities of one or more input data sets. Also, embodiments can delete earlier-created records that are no longer needed. After the named entity index is configured, embodiments are ready to answer user questions that are in a natural language format. To answer user questions, embodiments employ techniques for recognizing named entities in the user questions. When identifying named-entities in user questions, some embodiments search a named-entity index using text of an entire question. Each search result may have a matching score based on word matches. However, embodiments may update the score based on other criteria and rank the results based on updated scores. In turn, embodiments can identify named entity instances in the search results and present entity types associated with those named entity instances. By presenting entity types associated with the named entity instances, the system provides an answer to the question.

Some embodiments include a novel method of named entity recognition (NER) for use with cognitive business analytics products. Some embodiments of the NER system can dynamically adapt to user data, manage entity types automatically, and identify entities in users' questions according to domain and context that are finer grained and specific to their data/domain. These embodiments allow business analytics systems to generate more accurate queries that can be used to produce more insightful discoveries or analyses.

Some embodiments described herein achieve NER goals via operations including named-entity extraction, named-entity pruning, and named-entity recognition. Named-entity extraction and purging maintain an internal data structure at run time by which embodiments capture vital information about relationships among entity instances and their entity types. The operations for named-entity recognition classification and optimization analyze user questions, and identify and classify phrases into proper entity types. Some embodiments do not require human expertise or intervention. That is, some embodiments do not require extensive efforts to train statistic models for specific domains. Embodiments not only recognize named-entities that are private to the user, but also can dynamically adapt promptly to constant changes in users' structured data and recognize newly added entity types, and forget those obsolete entity types that have already been removed from user data. As a result, embodiments can provide better recognition of named-entities in user data. Also, embodiments can provide better classification of name-entities to finer grained categories specific to user data and domain, so the system can understand the question more accurately.

The description that follows includes exemplary systems, methods, techniques, instruction sequences and computer program products that embody techniques of the present inventive subject matter. However, embodiments may be practiced without these specific details as well-known instruction instances, protocols, structures and techniques may be omitted for clarity of description.

FIG. 1 is a data flow diagram illustrating components, operations, and data flow of some embodiments of the inventive subject matter. FIG. 1 shows a cognitive analytics system 100 including a cognitive analytics controller 102, named entity controller 108, input data set(s) 104, and search engine 106. In operation, the cognitive analytics system 100 may receive user questions about a topic, such as medicine, law, entertainment, etc. In response, some embodiments of the cognitive analytics system 100 can determine and present answers to the questions. However, before processing questions, the system 100 prepares the search engine 106 based on one or more input data sets 104.

As shown in FIG. 1, at stage one, the cognitive analytics controller 102 processes the input data set(s) 104 to create records 105. The input data set(s) 104 may be in tabular format, such as in one or more relational database tables, or in any other suitable format. FIG. 2 shows an example input data set in tabular format according to some embodiments. In FIG. 2, a table 200 includes an input data set about movies. More specifically, the table 200 includes the following columns: Title, Year, Release Day, Season, Box Office, and Budget. Referring back to stage one of FIG. 1, the cognitive analytics controller 102 can extract unique data values (e.g., named entities) from each categorical column of the tabular data (input data set 104) and annotate each data value with a lexical clue to form the records 105. For example (see FIG. 2), the cognitive analytics controller 102 can create Record 1 by extracting "The Hills Have Eyes 2" from the Title column and creating a lexical clue ("the hills have eyes 2"). The records may include additional data such as Entity type, Domain type, and Data Set Id. The cognitive analytics controller 102 can create a record for each entry in a relevant categorical column (e.g., the Title column in FIG. 2) (see Record 2 and Record 3 in FIG. 2). Also, At stage two of FIG. 1, the cognitive analytics controller 102 indexes the records and inserts them into the search engine 106. The search engine 106 can be used to answer user questions, as described herein.

To keep the search engine 106 relevant, some embodiments purge records out of the search engine 106 if one or more related input data sets are deleted or otherwise indicated as no longer relevant.

At stage three of FIG. 1, the cognitive analytics controller 102 receives natural language questions, identifies named entities in the questions, and provides answers to the questions. The following discussion describes more detail about how some embodiments identify named entities in user-provided natural language questions.

Figure 3:
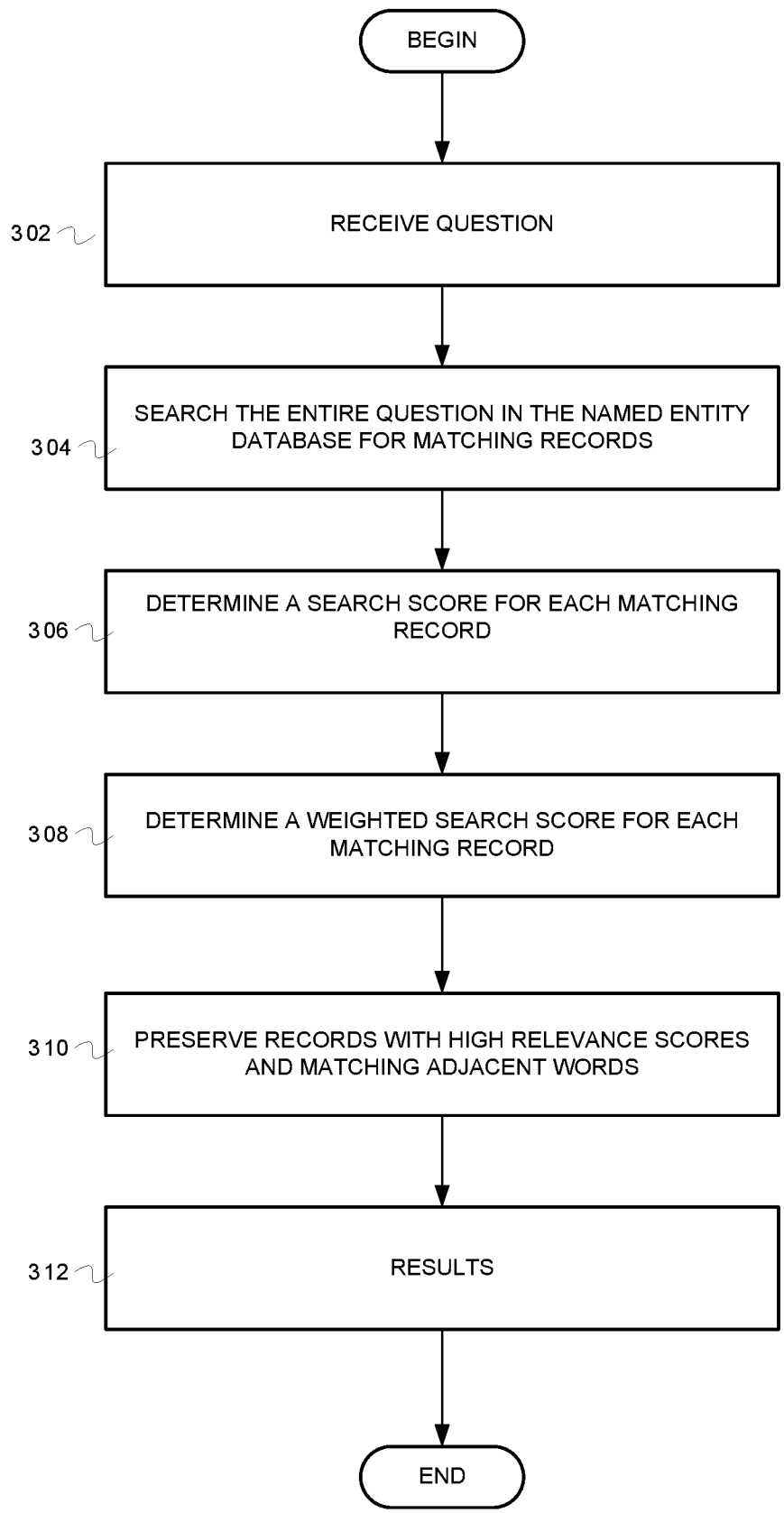
FIG. 3 describes operations for identifying named-entities in questions, according to some embodiments.

After embodiments configure a search engine based on an input data set (as described above), they can receive user questions and identify named-entities in those questions. FIG. 3 describes operations for identifying named-entities in questions, according to some embodiments. The operations of FIG. 3 will be described with reference to components of FIG. 1. A movie data set similar to FIG. 2 is used for this example. In FIG. 3, operations of flow diagram 300 begin at block 302.

At block 302, a question and answer system receives a question. In some embodiments, the cognitive analytics controller 102 receives the question. In this example, the question is: What is the box office and budget for love happens and the x files? The flow continues at block 304.

At block 304, the question and answer system searches the entire question in the named-entity index. In some embodiments, the named entity controller 108 uses the entire question (e.g., all the words in the question) to construct a search query for the search engine 106 for matching records. FIG. 4 illustrates a listing of example matching records from an input data set, according to some embodiments. In FIG. 4, there are four matching records 402, 404, 406, and 408. The flow continues at block 306.

At block 306, the question and answer system determines a matching score for each matching record. In some embodiments, the named entity controller 108 computes the matching scores. Referring back to FIG. 4, each of the matching records 402, 404, 406, and 408 include matching scores that indicate relevance of the matching record. At this point, the record 402 including "What happens in Vegas" has the highest rank. The flow continues at block 308.

At block 308, the question and answer system determines a weighted search score for each matching record. In some embodiments, the named entity controller 108 determines the weighted search score. FIG. 5 illustrates a listing of matching records for which weighted search scores have been determined, according to some embodiments. FIG. 5 shows matching records 502, 504, 506, and 508, each including a weighted score. Embodiments can determine score weighting based on any suitable criteria. For example, some embodiments may give higher weights to matching records whose "instance" field directly matches words or phrases in the question. Some embodiments may give greater weight if the words in the question match words in the record instance. Lesser weights may be given for partial matches. Lesser weights may be given as the partial matches appear in the record's instance clue. As shown in FIG. 5, the matching record 504 ("Love Happens") has the highest weighted score. Referring back to FIG. 3, the flow continues at block 310.

At block 310, the question and answer system preserves matching records with high relevance scores and most adjacent words. In some embodiments, the named entity controller 108 performs this operation. Some embodiments may preserve records that have a score greater than a particular threshold score. Some embodiments may only preserve a certain number of matching records. The threshold score and number of matching records to be preserved may vary per data set, per user-determined configuration settings, per dynamic parameters, etc. To keep the number of preserved records within a specified limit (e.g., based on configuration settings), some embodiments preserve the matching record whose "instance" field has the most matching adjacent words from the question. FIG. 6 illustrates a listing of matching records that have been preserved, according to some embodiments. FIG. 6 shows preserved matching records 602 and 604. The matching record 604 had more matching adjacent words from the question. Referring back to FIG. 3, the flow continues at block 312.

At block 312, the question and answer system provides the results. For example, the named entity controller identifies named entities in the question that appear in the search data. FIG. 7 illustrates records from the search data that match named entities in the question, according to embodiments. In FIG. 7, the named entity controller 108 returns records that identify "love happens" and "the x files" as named entities that are classified as "titles". From block 312, the flow ends.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium includes one or more tangible components. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
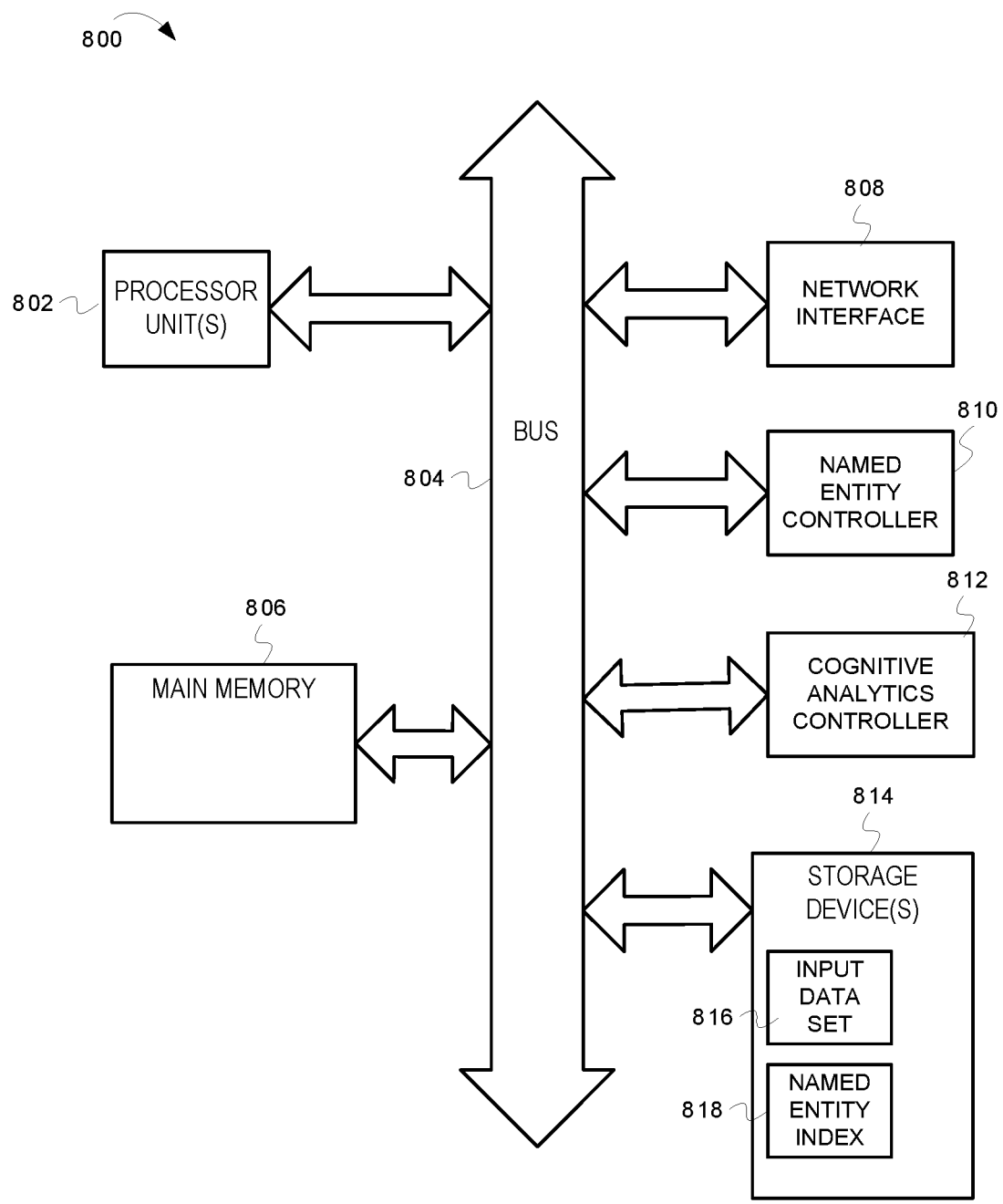
FIG. 8 depicts an example computer system.

FIG. 8 depicts an example computer system. A computer system includes a processor unit 802 (possibly including multiple processors, multiple cores, multiple nodes, and/or implementing multi-threading, etc.). The computer system includes main memory 806. The main memory 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 804 (e.g., PCI, ISA, PCI-Express, HyperTransport®, InfiniBand®, NuBus, etc.), a network interface 808 (e.g., an ATM interface, an Ethernet interface, a Frame Relay interface, SONET interface, wireless interface, etc.), and a storage device(s) 814 (e.g., optical storage, magnetic storage, etc.).

Named entity controller 810 and cognitive analytics controller 812 are connected to the bus 804. In some embodiments, the named entity controller 810 and cognitive analytics controller 812 can perform the operations described above vis-à-vis FIGS. 1-7. In some embodiments, the named entity controller 810 and cognitive analytics controller 812 are not connected to the bus 804 but instead reside in one or more memory devices of the system 800. For example, the controllers 810 and 812 may be implemented as machine-executable instructions residing in the main memory 806 and/or on the storage device(s) 814. The storage device(s) 814 include a named entity index 816 and input data set 818. The functionalities of the controllers 810 and 812 may be partially via the processing unit 802. In some embodiments, the functionalities describe herein may be implemented with an application specific integrated circuit, in logic implemented in the processing unit 802, in a co-processor on a peripheral device or card, etc. Further, realizations may include fewer or additional components not illustrated in FIG. 8 (e.g., video cards, audio cards, additional network interfaces, peripheral devices, etc.).

While the embodiments are described with reference to various implementations, these embodiments are illustrative and that the scope of the inventive subject matter is not limited to them. In general, techniques for identifying named entities in a named entity index as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are not rigid, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for identifying named entities in a question received in a question and answer system, the method comprising:
   processing an input data set from a cognitive analytics system to create records having named entity fields, a record including a unique data value, a lexical clue for the unique data value that is different from the unique data value, and an entity type;
   indexing the records to create a named entity index;
   receiving the question by the question and answer system;
   constructing, via a named entity controller, a search query using all words in the question;
   searching, via the named entity controller, the named entity index for records that include named entity fields associated with certain of the words in the question;
   determining, via the named entity controller, a search score for each of the records based, at least in part, on how closely words in the question match a field of the record;
   determining, via the named entity controller, a weighted score for each of the records based, at least in part, on whether the words in the question match the unique data value for the record or the lexical clue for the record, where a greater weighted score is determined when the words in the question match the unique data value than when the words in the question match the lexical clue;
   creating, via the named entity controller, a list of records including one or more of the records whose weighted score is above a threshold score;
   providing, via the named entity controller, the list of records for use in answering questions in the question and answer system;
   updating the records, including deleting at least one record and creating at least one additional record, based, at least in part, on changes to the input data set made by the cognitive analytics system; and
   re-indexing the records according to the updating.

2. The method of claim 1, wherein the weighted score is higher as the words in the question are positioned closer to a beginning of the question.

3. The method of claim 1, wherein the search score is higher as more words in the question match the field of the record.

4. The method of claim 1 further comprising:
   receiving the input data set as one or more tables;
   extracting unique data values from each column of the one or more tables;
   for each of the unique data values, creating a record in the named entity index, wherein the record includes one of the unique data values, a lexical clue for the one of the unique data values, and an entity type.

5. The method of claim 1, wherein the question is in natural language form.

6. The method of claim 1, wherein the question is received from the user via a network interface.

7. A computer readable medium including computer executable program code for identifying named entities in a question, the computer executable program code comprising:
   program code to process an input data set associated with a user to create records having named entity fields, a record including a unique data value, a lexical clue for the unique data value that is different from the unique data value, and an entity type;

program code to index the records to create a named entity index;

program code to receive the question by the question and answer system;

program code to constructing, via a named entity controller, a search query using all words in the question;

program code to search, via the named entity controller, the named entity index for records that include named entity fields associated with certain of the words in the question;

program code to determine, via the named entity controller, a search score for each of the records based, at least in part, on how closely words in the question match a field of the record;

program code to determine, via the named entity controller, a weighted score for each of the records based, at least in part, on whether the words in the question match the unique data value for the record or the lexical clue for the record, where a greater weighted score is determined when the words in the question match the unique data value than when the words in the question match the lexical clue;

program code to create, via the named entity controller, a list of records including one or more of the records whose weighted score is above a threshold score;

program code to provide, via the named entity controller, the list of records for use in answering questions in the question and answer system;

program code to update the records, including deleting at least one record and creating at least one additional record, based, at least in part, on changes to the input data set associated with the user; and program code to re-index the records according to the updating.

8. The computer readable medium of claim 7, wherein the weighted score is higher as the words in the question are positioned closer to a beginning of the question.

9. The computer readable medium of claim 7, wherein the search score is higher as more words in the question match the field of the record.

10. The computer readable medium of claim 7, the program code further comprising:

program code to receive the input data set as one or more tables;

program code to extract unique data values from each column of the one or more tables;

program code to, for each of the unique data values, creating a record in the named entity index, wherein the record includes one of the unique data values, a lexical clue for the one of the unique data values, and an entity type.

11. The computer readable medium of claim 7, wherein the question is in natural language form.

12. The computer readable medium of claim 7, wherein the question is received from the user via a network interface.

13. A system comprising:

one or more processors;

one or more computer readable storage mediums including program code executable on at least one of the one or more processors, the program code for identifying named entities in a question, the computer executable program code including:

program code to process an input data set associated with a user to create records having named entity fields, a record including a unique data value, a lexical clue for the unique data value that is different from the unique data value, and an entity type;

program code to index the records to create a named entity index;

program code to receive the question by the question and answer system;

program code to constructing, via a named entity controller, a search query using all words in the question;

program code to search, via the named entity controller, the named entity index for records that include named entity fields associated with certain of the words in the question;

program code to determine, via the named entity controller, a search score for each of the records based, at least in part, on how closely words in the question match a field of the record;

program code to determine, via the named entity controller, a weighted score for each of the records based, at least in part, on whether the words in the question match the unique data value for the record or the lexical clue for the record, where a greater weighted score is determined when the words in the question match the unique data value than when the words in the question match the lexical clue;

program code to create, via the named entity controller, a list of records including one or more of the records whose weighted score is above a threshold score;

program code to provide, via the named entity controller, the list of records for use in answering questions in the question and answer system;

program code to update the records, including deleting at least one record and creating at least one additional record, based, at least in part, on changes to the input data set associated with the user; and program code to re-index the records according to the updating.

14. The system of claim 13, wherein the weighted score is higher as the words in the question are positioned closer to a beginning of the question.

15. The system of claim 13, wherein the search score is higher as more words in the question match the field of the record.

16. The system of claim 13, the program code further comprising:

program code to receive the input data set as one or more tables;

program code to extract unique data values from each column of the one or more tables;

program code to, for each of the unique data values, creating a record in the named entity index, wherein the record includes one of the unique data values, a lexical clue for the one of the unique data values, and an entity type.

17. The system of claim 13, wherein the question is in natural language form.

18. The method of claim 1, wherein the input data set associated with the user is private to the user, having one or more named entity fields not included in publicly available named entity data.

19. The method of claim 1, wherein the updating and the re-indexing occur automatically, at run time, in response to the changes to the input data set associated with the user.

20. The method of claim 1, wherein creating the list of records further comprises preserving, via the named entity controller, a record having a field with the most matching adjacent words from the question.

* * * * *